(No Model.)
H. A. HUNICKE.
ART OF OBTAINING GOLD.
No. 560,997. Patented May 26, 1896.
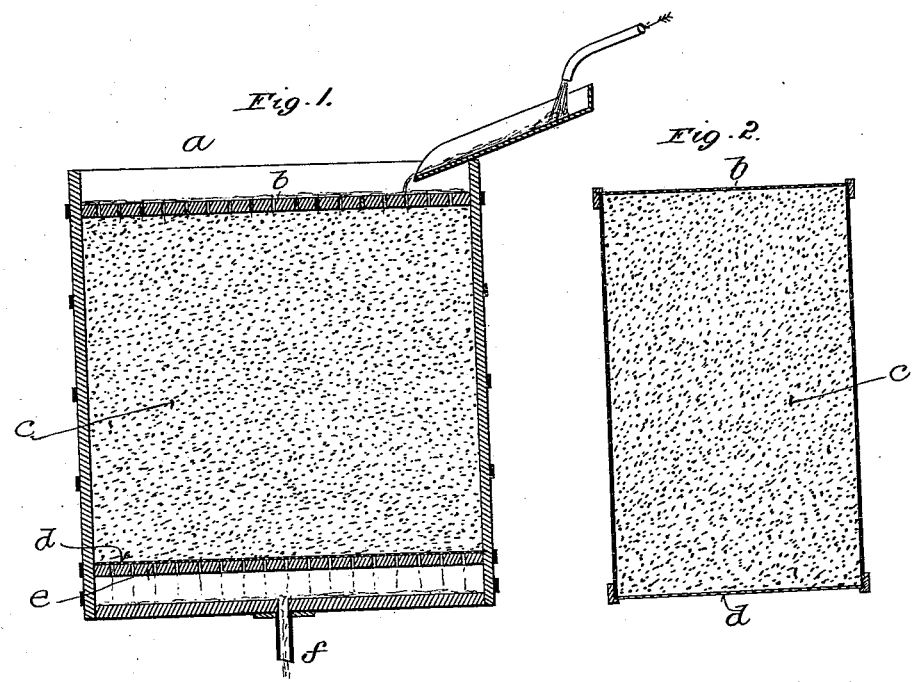
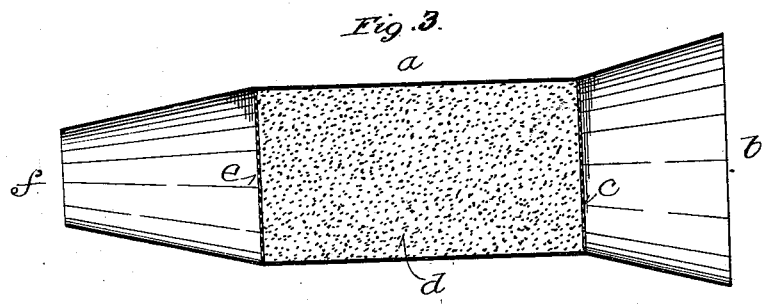
WITNESSES:
Edward W. Furrell
A. Bonville
INVENTOR:
Henry A. Hunicke
by C. D. Moody
his atty

# UNITED STATES PATENT OFFICE

HENRY AUG. HUNICKE, OF ST. LOUIS, MISSOURI.

ART OF OBTAINING GOLD.

SPECIFICATION forming part of Letters Patent No. 560,997, dated May 26, 1896.

Application filed December 11, 1893. Serial No. 493,414. (No model.)

*To all whom it may concern:*

Be it known that I, HENRY AUGUST HU-NICKE, of St. Louis, Missouri, have discovered a new and useful Improvement in the Art of Obtaining Gold, of which the following is a full, clear, and exact description.

My improvement has for its object the obtaining of gold from sea-water, which contains gold in solution in the presence of calcium iodate.

I have discovered that when sea-water is brought in contact with certain kinds of carbonaceous substances the gold of the water is deposited thereon. Of the three general forms of carbonaceous substances animal substances are the most effective for the purpose in question; vegetable come next in value. Of charcoals, bone-black seems to be the most effective; but any charcoal, I may say, effects the result. A freshly-prepared one, however, acts more effectively. So does a freshly-broken surface of an old charcoal act more energetically than does a surface long exposed to the atmosphere. A strong hard charcoal is better than a soft mushy one. Coke acts in the same way, though not so effectively as does charcoal, and, like charcoal, it is better when fresh.

The invention can be carried out in various ways. I have obtained the best results by allowing the sea-water to flow through a layer of charcoal, and this method in practice will usually be the simplest and cheapest. It requires a tank containing the charcoal and a pump of ordinary design and operation, or any equivalent means, for delivering the water to the charcoal. The tank may be of wood and of the simplest form. It may hold any preferred quantity of charcoal and in the form of a layer of any preferred depth. The water may be delivered into the tank at any proper point therein, usually at a point above the charcoal, and after passing through the charcoal layer it is discharged from the tank, and to sustain the charcoal and to prevent it from escaping with the water any suitable means—a perforated screen, for instance—may be arranged between the charcoal and the outlet through which the water leaves the tank. Care should be taken to prevent water that has been treated from mingling with and impoverishing the water going to the tank. The action of the tides and ocean currents, however, largely obviates this difficulty. The plant may be arranged upon the shore, and the pipe for supplying the water may extend any distance into the ocean, or it may be upon wharfing, fixed or movable, and the water taken from nearby or farther away, or, again, the apparatus may be on a vessel, which during the operation may cruise about.

In the annexed drawings, making part of this specification, Figure 1 is a vertical section of a tank adapted to be fixed on shore or wharfing; Fig. 2, a similar section of a tank adapted to be fixed either to piling or anchored and either submerged entirely or so that it occupies a position out of water at low tide and in water at high tide, and Fig. 3 a section of a tank adapted to be fixed to the hull of a ship below the water-line.

In Fig. 1, *a* represents the tank; *b*, a perforated top through which the water can pass downward; *c*, the contents of the tank; *d*, paper, canvas, cloth, wire-gauze, or perforated metal for retaining the finer portion of the contents of the tank; *e*, a perforated support for the parts *d* and *c*, and *f* the outlet for the water. In this form of tank the water must be supplied by pumping or other expenditure of power, the water entering the tank at the top and leaving it at the bottom.

In the tank shown in Fig. 2, *b* represents a perforated top through which the water can pass, *c* the contents of the tank, and *d* a perforated support for the contents of the tank. In this form of tank the water is moved therethrough by the natural force of the tides and ocean currents.

In the form of tank shown in Fig. 3, *a* represents the tank; *b*, the inlet thereto for the water; *c*, a perforated diaphragm; *d*, the contents of the tank; *e*, another perforated diaphragm, and *f* the outlet from the tank. In this form of tank the tank is moved instead of the water. The herein-described construction represents types only, and no stress is laid on details.

I desire not to be restricted to any special carbonaceous substance, as any carbonaceous substance answers my purpose which remains as residue from carbonaceous matter that has been heated to at least a charring temperature without access of air, be the carbonaceous substance of either vegetable, animal, or mineral origin. The selection of the best substance to employ is determined largely by local conditions and other commercial considerations. The charcoal, bone-black, or whatever form of substance is used should be finely divided, but not so fine as to be carried off with the water as it flows from the tank. When animal charcoal is used, and in the form of a layer, say two inches deep, the particles may be as fine as those of granulated sugar. The deeper the layer the coarser the particles. Particles of the size of a hazel-nut or a walnut can be used advantageously.

The rate or pressure with which the water flows through the layer may require the particles to be larger or smaller, according to the rate or pressure. With a given rate of flow the greater the pressure the smaller may be the particles of the carbonaceous substance. The temperature has no special bearing upon the result, so long as the water can flow through the charcoal, although it in a general way may be said that the warmer the temperature (within practical limits) the better the result. The operation in effect is a reducing of the gold from its original state in the sea-water into a metallic form. The gold, I may say, is plated, as it were, onto the several particles of the carbonaceous substance, an operation which not only reduces but also concentrates the gold.

The operation, so far as a single molecule of the carbonaceous substance is concerned, is a momentary one, but to enable the water to reach each molecule in the layer necessarily requires more or less time.

At Santa Barbara, California, just off the shore, during the forenoon of the 8th of August, 1893, I passed a ton of sea-water at a rate of one pint a second downward through a layer of charcoal six inches in diameter and sixteen inches in depth, whose particles averaged from one-quarter of an inch to an inch in diameter, and subsequently, upon igniting the charcoal and then smelting the ash, a button of gold was obtained. This operation was afterward—between the 14th and the 22d days of September of the present year—repeated several times and each time with a similar result.

When the carbonaceous substance has received its quota of gold, it is treated by any of several well-known methods to recover the gold, the simplest of which may be, in case a smelter is conveniently at hand, to consider it a gold ore, for the coal now serves as a fuel in smelting the product from the tank, thus economizing the smelting charges and enabling the gold to be sold for its bullion value. Instead of smelting the charcoal the gold can also be leached out by cyanid of potash and subsequently precipitating the gold from the cyanid solution by known methods.

So far as applying the water to the carbonaceous substance is concerned the procedure may be in at least four ways: first, by a continuous flow of sea-water through a layer of charcoal contained in a vessel; second, by filling a number of vessels containing the carbonaceous substance and allowing the water to stand awhile therein and then draining the vessels and refilling them with fresh water; third, a porous vessel may be filled with charcoal and then suspended in sea-water and exposed to the action of the water at any fixed point, or, fourth, a porous or perforated vessel containing the carbonaceous substance may be moved about in the sea-water.

The carbonaceous substance having the gold deposited thereon, as described, becomes an article of merchandise. It is not essential that the after treatment thereof be immediate. It can, under proper conditions to guard it against injury, be transported from place to place and stored for a shorter or longer period of time.

I claim—

The process of separating gold from sea-water containing gold in solution in the presence of calcium iodate, which consists in bringing said sea-water into intimate contact with an excess of carbon; substantially as described.

Witness my hand this 9th day of December, 1893.

H. AUG. HUNICKE.

Witnesses:
C. D. MOODY,
A. BONVILLE.